Patented Aug. 26, 1941

2,253,590

UNITED STATES PATENT OFFICE 2,253,590

PURIFICATION OF ACIDIC LIQUORS

Roy W. Sullivan, Wilmington, Del., assignor to E. I. du Pont de Nemours & Company, Wilmington, Del., a corporation of Delaware No Drawing. Application April 20, 1939, Serial No. 268,942

10 Claims. (Cl. 23—172)

This invention relates to the treatment of residual acid liquors for the purpose of rendering the same capable of reuse, and more particularly to the purification of residual liquors obtained from titaniferous ore decomposition.

More specifically, the invention is directed to the purification of the residual acidic liquors resulting from the hydrolysis of titanium salt solutions, and further, to the removal and recovery of rare earths present in such liquors.

Titanium pigments, such as titanium oxide, are usually obtained through attack by relatively strong sulfuric acid upon titaniferous ores such as ilminite or rutile. The soluble titanium and iron values which are obtained are then leached out, most of the iron sulfate being removed by crystallization. The titanium sulfate is then hydrolyzed at elevated temperatures, the precipitated titanium oxide hydrolysis product being filtered out, washed, dried, calcined and ground to be made ready for use as a pigment. The filtrate or waste acid from the hydrolysis step contains in excess of 10% by weight of sulfuric acid, small amounts of titanyl sulfate, and from about 5 to 30% or more of ferrous sulfate. In addition, and particularly where such residual hydrolysis liquors comprise those obtained from titaniferous ores of the beach sand type containing varying amounts of rare earth minerals, such as monazite, said liquors contain relatively small amounts of rare earths of either the ceria or yttria or gadolinite type, or both. Because relatively dilute and highly contaminated in character, recovery and reuse of these residual acid liquors has heretofore proved very difficult and, when successful, unprofitable.

In titanium oxide production through titaniferous ore decomposition, sulfuric acid costs are a major item of expense. Obviously, discarding the residual acid liquors produced in these processes involves not only a serious nuisance problem, but a vital economic factor as well. A proposed waste acid use contemplates preparation of anhydrous calcium sulfate and in accordance with U. S. Patent 2,006,342. However, when such residual acids are used for such purpose and in substitution for fresh acid, the disadvantage exists that a decidedly off-color product results. Similarly, when reemployed in a titanium oxide producing operation, such as by concentrating the waste acid through evaporation or otherwise prior to use, the resultant titanium oxide differs very materially from products resulting from relatively pure or virgin acid. Thus, as in the instance of calcium sulfate, said titanium oxide pigments are characteristically off-color and of yellow or yellowish-brown tint. As such, they are non-useful for commercial pigment applications.

It has been discovered that this unsatisfactory color of pigment products from residual acid liquors arises by virtue of the presence in such liquors of various colored ions and particularly the rare earth elements, such as cerium, praseodymium, neodymium, yttrium, etc. These are absorbed on or occluded in the pigment product during formation or precipitation.

It is among the objects of this invention to overcome these and other disadvantages which arise in residual acid liquor use and to provide a novel method for purifying said liquors, in order to render the same adaptable to all manners of use. One salient object of the invention is to provide a novel type of treating agent and method for employing the same, whereby purification of residual acid liquors may be easily effected and complete removal therefrom had of objectionable color-contaminating ions, particularly rare earths. A further and special object includes the provision of a useful and effective method for reconditioning waste acid liquors from titanium oxide hydrolysis so that such liquors when reused in the production of pigments or extenders will afford production of products exhibiting satisfactory color and desired whiteness. A further particular object is to provide a useful process for readily recovering rare earth elements and in relatively concentrated state from residual acid liquors, whereby said elements upon suitable conversion become readily amenable for use in ceramics or other commercial applications or arts.

These and other objects are attainable in this invention, which broadly comprises subjecting residual acid liquors to the action of calcium sulfate and so regulating the conditions of calcium sulfate treatment as to effect substantially complete removal and in relatively concentrated state of the colored ionic materials, particularly rare earths, present therein.

In a more specific and preferred embodiment, the invention comprises subjecting residual acid liquors produced during the hydrolysis of soluble titanium values obtained from a monazite-containing titaniferous ore, to contact treatment with calcium sulfate at such concentrations and under such conditions of temperature as will promote calcium sulfate crystal growth or phase transition to remove, through occlusion or adsorption, rare earths present therein.

In practically adapting the invention, there is preferably subjected to treatment a rare earth containing residual acid liquor, such as results from the hydrolysis step of a titanium pigment-producing operation after acid attack of a monazite-containing ilmenite or like titaniferous ore. Such residual hydrolysis liquors contain in solution varying quantities of rare earth metals, together with from about 20% to 40% by weight of sulfuric acid. In effecting treatment there is incorporated or suspended in such liquor, through addition or otherwise, an amount of calcium sulfate equalling substantially from about 10 to about 100 times by weight the amount of combined rare earth oxides. Preferably, the quantity of calcium sulfate used ranges from about 20 to about 50 g./l. of liquor being treated. Admixture of calcium sulfate with said liquor is effected and such liquor conditions are maintained, as stated, as will favor and promote transition of the calcium sulfate from one phase to another, particularly from a state of more or less complete hydration to one which is substantially anhydrous. One such preferred type of phase transition comprises that which arises when solid phase calcium sulfate loses its water of crystallization. Conditions best adapted for such preferred phase transition comprise those in which the liquor to be purified is relatively highly concentrated, e. g., when its $H_2SO_4$ content ranges from about 20% to 40%; when finely-divided or ground hemihydrate and/or gypsum is used in the treatment; and temperatures ranging from about 20° C. to the solution boiling point, and preferably from about 90° C. to 100° C., are employed. Liquor treatment, accompanied by agitation or stirring, is continued under such preferred conditions for an hour or two and until such time as the elements to be removed therefrom become associated through occlusion with the solid phase calcium sulfate.

The purified liquor is then recovered by decanting, extraction or filtration. The residual solids may be suitably treated for various desired uses. Thus, said residue, after washing, may be subjected to calcination and employed in either ceramic preparations or as a coloring agent or colored pigment, or as an extender for colored pigments. If desired, said residue may be suitably treated to effect conversion and recovery of the concentrated rare earths present therein, such as by fusing the gypsum residue with an alkali, such as sodium carbonate, or by boiling the gypsum solution residue with alkalies such as ammonium, sodium or potassium carbonate, etc., whereby the calcium and rare earths become converted to their insoluble carbonates. After suitable leaching, washing and filtering to free the solids of sodium sulfate, the mixed carbonates may be brought into solution with hydrochloric acid. The rare earths can then be separated from the calcium by well-known methods, such as by precipitating the same as hydroxides after suitable dilution and/or pH adjustment.

In order that the invention may be more clearly understood, the following illustrative examples are given, none of which are to be considered as in limitation of the invention:

Example I

To 1 liter of a typical residual acid liquor maintained at a temperature of about 90° C. and containing from about 1 to 5 g./l. of rare earth metals calculated as mixed oxides, there were added 45 grams of hemihydrate ($CaSO_4.\frac{1}{2}H_2O$). This liquor was obtained from the hydrolysis step of a $TiO_2$ pigment-producing operation after $H_2SO_4$ acid attack upon ilmenite. The $H_2SO_4$ concentration of the liquor was approximately 30%. Calcium sulfate addition was effected while stirring, said stirring being continued during the dehydration of the hemihydrate to maintain it in suspension. At the end of one hour, the liquor in purified state was filtered off and employed in the preparation of pigment anhydrite, in accordance with the procedures of U. S. Patent 2,006,342. The anhydrite product was found to be of very white color, exhibited excellent pigmentary characteristics and was highly useful as a pigment extender.

The effectiveness of the purification treatment thus had and the fact that substantially complete and 100% removal of rare earth metals present in the liquor resulted was demonstrated by the fact that when a suitable quantity of sodium sulfate was added to the purified acid, no precipitate resulted; whereas, when the untreated acid was comparably tested, formation of a precipitate resulted, demonstrating the presence therein of rare earth elements.

Example II

To 1 liter of the same type of residual liquor as that of Example I there was added with stirring for $\frac{1}{4}$ to $\frac{1}{2}$ hour 2–5 grams of insoluble anhydrite and 35–40 grams of gypsum ($CaSO_4.2H_2O$). In effecting treatment in accordance with this example, the conditions of Example I were duplicated. As a result, it was determined that approximately 100% of the objectionable rare earth impurities present in said liquor was removed at the end of one hour. The liquor was then used to produce pigment-useful calcium sulfate in accordance with said Patent 2,006,342, which product was found to be of excellent white color and other desired pigmentary characteristics.

Example III

To 1 liter of waste acid maintained at a temperature of 90 to 100° C., obtained from the hydrolysis step in the production of titanium oxide from ilmenite, there was added for a period of $\frac{1}{4}$ to $\frac{1}{2}$ hour, first about 5 grams of soluble anhydrite and then about 40 grams of gypsum. The conditions of treatment set out in Example I were duplicated, the soluble anhydrite converting to the insoluble form which then converts the gypsum to the insoluble state and effects removal of the rare earths by adsorption.

Example IV

To 1 liter of waste acid maintained at a temperature of 90 to 100° C. and obtained from the hydrolysis step in the production of titanium oxide from ilmenite, there were added for a period of about $\frac{1}{2}$ hour, with stirring, 35–40 grams of natural gypsum. This gypsum contained about 3% of insoluble anhydrite, adapted to aid the transition of the gypsum to an insoluble form of calcium sulfate. Treatment under the conditions specified was effected for a period of about 1 hour, at the end of which it was found on test a purified liquor resulted and in which no rare earths were present. The recovered liquor was then employed while admixed with virgin sulfuric acid in ilmenite ore attack and for the production of titanium oxide.

Example V

To 1 liter of waste hydrolysis acid liquor at a temperature of about 95° C. and of a composition substantially the same as that of Example I, there were added, accompanied by stirring over a period of ¼ to ½ hour, 2-5 grams of soluble anhydrite and then about 35-40 grams of gypsum. Such soluble anhydrite converts to the insoluble form, the latter then converting the gypsum to insoluble anhydrite during the treatment. After about 1 hour, conversion of the gypsum to anhydrite takes place during which removal of the rare earth impurities present becomes effected. At the end of said period, the purified liquor was filtered off, removed and the rare earth containing calcium sulfate subjected to treatment to recover said rare earth metals in concentrated state.

Example VI

To 1000 parts by weight of acid recovered from titanium pigment operations carrying 30% free $H_2SO_4$ and a temperature of 20° C. was added 45 parts by weight of hemihydrate ($CaSO_4 \cdot \frac{1}{2}H_2O$). This was stirred for about one hour and then examined for hydration of the suspended calcium sulfate. It was found to have been transformed into gypsum ($CaSO_4 \cdot 2H_2O$) which was subsequently removed by filtration and the purified acid filtrate was then used for the production of pigment useful anhydrite by the process of U. S. Patent 2,006,342 as in Example I. This pigment anhydrite was likewise found to be of very white color and served to produce an extended pigment of highest quality when blended with $TiO_2$ in the ratio of 70 parts of calcium sulfate to 30 parts of titanium oxide.

As indicated, the preferred conditions for the reaction between the calcium sulfate and the acid solution are those favoring a phase transition of the calcium sulfate, particularly one of dehydration type (in which the solid phase loses its water of crystallization). Conversely, hydration type transition (in which water of crystallization is gained by the solid phase) may also be employed. Conditions which favor such latter type comprise low acid concentration and low temperature conditions. Preferably, in instances where the hydration type of transition is used, soluble anhydrite or hemihydrate are added and conversion to gypsum effected at the lower temperatures, preferably ordinary room temperature.

While, as indicated, the phase transition is preferred as a rapid method of effecting reaction between the calcium sulfate and the acid solution, the invention is not to be limited thereto. The mere growth of the crystals of a single calcium sulfate modification could be employed in treating the acid.

The source or type of calcium sulfate to be employed is also not to be considered as limited. Such agent may comprise naturally-occurring calcium sulfate, a manufactured product such as plaster of Paris, soluble anhydrite, precipitated gypsum, etc., or mixtures of the same, or may be produced in any of its forms by a suitable chemical reaction within the body of the acid to be treated. In instances where gypsum is used and converted to anhydrite, it will be found advantageous to have a small quantity of insoluble anhydrite present in the system. This substance acts as a seeding agent and hastens the transition of the remainder of the solid phase.

Theoretically considered, the instant invention utilizes the phenomenon of occlusion and possibly that of adsorption during crystal growth to remove the ions involved from the surrounding solution. Apparently the nature of these ions is sufficiently compatible with that of the crystal structure of the calcium sulfate so that they become a part of the crystals as they form or grow, and hence are removed from the solution. Crystal growth rate during the transition from one crystal form to another is usually at a maximum and therefore conditions favoring transition comprise those which are preferred in the invention.

The invention possesses many advantages not obtainable from previously known methods. Its application to the recovery of rare earths from acid solutions is particularly effective for removing and recovering such compounds and in concentrated state, from solutions containing the same, whereby their conversion and recovery for reuse becomes easily had.

From the point of view of utilizing the acid liquors after treatment, the instant process is one which makes possible the production by known methods of a white titanium pigment of improved color. When applied to the purification of waste acid to be subsequently used in the production of calcium sulfate of white pigment quality, a particularly notable effect and improvement is had. Not only will decided improvements in the color values of white pigments produced by the invention be noted, but the additional advantage exists in that no fritting action on the final pigment results. The formation of frits in such pigment is very harmful and tends to appear when the liquors are treated with other salts more soluble than calcium sulfate.

The pronounced effect upon color of white pigment products obtained by this invention will be readily apparent by comparing oil pastes of the white pigments obtained from untreated acid liquors and the pigments made from acids or liquors treated in accordance with this invention, a suitable method for the purpose comprising that described by J. E. Booge and H. E. Eastlack in the Paint, Oil and Chemical Review, dated April 9, 1924.

The invention is particularly effective in purifying the waste acid from titanium pigment producing operations. When the unpurified acid is employed instead of virgin acid for making anhydrite, the product will be characterized by a yellow or yellowish brown color, making it unfit for use in white pigment products. However, when said acid is first treated by the process herein described and then used for the production of anhydrite, the resulting product will be of excellent whiteness and otherwise adapted and well suited for use in white pigment products.

A further advantage of the invention resides in the fact that the purified liquor will be suitable for recirculation or reuse in a titanium producing operation, by either concentrating purified acid and using the same alone, or by admixing the same with fresh acid to be used in various steps of the $TiO_2$ producing operation.

As already indicated, the invention is adapted to the removal and recovery in concentrated form of rare earth metals and certain other elements from acid solutions, and is at the same time advantageous in the treatment of the liquors obtained from the decomposition of titaniferous ores to render the same useful for the production of valuable white products or capable of reuse in the titanium producing operation.

As will be noted, purification of acid solutions through removal of impurities therefrom in accordance with the invention is fundamentally based on the transition of $CaSO_4.\frac{1}{2}H_2O$ to $CaSO_4.2H_2O$ or $CaSO_4.2H_2O \rightleftharpoons CaSO_4$, and not, except under the conditions mentioned, through mere adsorpton. While the invention is particularly applicable to the purification of residual sulfuric acid liquors obtained from titanium hydrolysis and pigment producing operations and direct treatment of such residual liquors is preferably had, one may obtain its beneficial effects by similarly treating titanium salt solutions prior to hydrolysis. As a consequence, and due to the prevailing hydrolysis temperature and other conditions subsequently existing, a dehydrating phase ensues and desired transition of the calcium sulfate results. Any color-imparting ions present in such hydrolysis acid liquor are thereby removed and prior to $TiO_2$ precipitation. Ultimate procurance of an uncontaminated precipitate may thus be advantageously had. Separation of the impurities containing calcium sulfate and recovery of the purified residual hydrolysis acid liquor can then be subsequently effected in the manners already mentioned. Accordingly, this modification is to be considered as within the contemplated scope of the invention.

I claim as my invention:

1. A process for removing color-imparting ions from a residual sulfuric acid solution obtained from the hydrolysis of a titanium salt solution, comprising contacting said solution with calcium sulfate, during such contact maintaining the solution under conditions adapted to effect a change in the physical and chemical state of the calcium sulfate, through conversion and transition of said sulfate from one crystal form to another, and separating and recovering the purified acid solution from the residual calcium sulfate containing adsorbed impurities.

2. A process for removing rare earth compounds from residual acid solutions obtained during the hydrolysis of titanium compounds comprising subjecting said solutions to contact with calcium sulfate, during such contact maintaining such conditions of temperature and acid concentration as will promote a change in the physical and chemical state of said calcium sulfate, through conversion and transition of said sulfate from one crystal form to another and thereafter separating and recovering the resultant purified acid solution from the residual calcium sulfate containing adsorbed impurities.

3. A process for removing rare earth compounds from a residual acid solution produced during the hydrolysis of titanium compounds, comprising subjecting said solution to contact with an amount of calcium sulfate ranging from about 10 to about 100 times the amount of combined rare earth oxides present in said solution, during such treatment maintaining the mixture under such acid concentrations and temperature conditions as will induce a change in the physical and chemical characteristics of said calcium sulfate, through conversion and transition of said sulfate from one crystal form to another and thereafter separating and recovering the resultant purified acid solution from the residual sulfate containing adsorbed impurities.

4. A process for removing rare earth compounds from a residual acid solution produced during the hydrolysis of titanium compounds, comprising subjecting said solution to contact with an amount of calcium sulfate ranging from about 20 to about 50 times the amount of combined rare earth oxides present in said solution, during such treatment maintaining the mixture under such acid concentrations and temperature conditions as will induce a change in phase of the physical and chemical characteristics of said calcium sulfate through conversion and transition of said sulfate from one crystal form to another and thereafter separating and recovering the resultant purified acid solution from the residual calcium sulfate containing adsorbed impurities.

5. A process for removing rare earth compounds from a residual acid solution produced during the hydrolysis of titanium compounds, comprising subjecting said solution to contact with a hydrated form of calcium sulfate ranging from about 20 to about 50 times the amount of combined rare earth oxides present in said solution, during such treatment maintaining the mixture under such acid concentrations and temperature conditions as will induce a change in the physical and chemical characteristics of said calcium sulfate, through conversion and transition of said sulfate from one crystal form to another and thereafter separating and recovering the resultant purified acid solution from the residual calcium sulfate containing adsorbed impurities.

6. A process for removing rare earth compounds from a residual acid solution obtained from the hydrolysis step of a titanium producing operation after acid attack upon a monazite containing ilmenite ore, comprising subjecting said solution to contact with a hydrated form of calcium sulfate, during such contact maintaining said solution at an acid concentration ranging from about 20 to 40% $H_2SO_4$ and at a temperature ranging from 20° C. to the boiling point, whereby removal of said rare earth compounds is effected by occlusion and adsorption on said calcium sulfate upon change in the crystal state and degree of hydration of said sulfate, and thereafter separating and recovering the resultant purified solution from the residual calcium sulfate containing adsorbed impurities.

7. A process for removing rare earth compounds from a residual acid solution obtained as a result of the hydrolysis of a titanium solution produced from acid attack of a monazite containing ilmenite ore, comprising admixing calcium sulfate in an amount ranging from about 10 to 100 times the amount of combined rare earth oxides present in said solution, maintaining the resultant mixture at a temperature ranging from about 20° C. to the boiling point, and upon substantial change in the degree of hydration of said calcium sulfate, separating and recovering the purified residual acid liquor from the residual calcium sulfate containing adsorbed impurities.

8. A process for removing rare earth compounds present in a residual acid solution produced as a result of the hydrolysis of a titanium salt solution, comprising mixing with said residual acid solution an amount of calcium sulfate ranging from about 20 to about 50 times the amount of combined rare earth oxides present in said solution, during contact of said calcium sulfate with said solution maintaining the latter at an $H_2SO_4$ concentration ranging from 20 to 40% and at a temperature ranging from 20° C. to the boiling point, and upon a substantial change in the degree of hydration of said calcium sulfate separating and recovering the resultant purified acid solution from the residual calcium sulfate containing adsorbed impurities.

9. A process for removing rare earth compounds from a residual acid solution produced during the hydrolysis step of a titanium pigment-producing operation, comprising, while maintaining said residual acid solution at an $H_2SO_4$ concentration of from 20 to 40%, admixing therewith a hydrated form of calcium sulfate in an amount ranging from about 20 to about 50 times the amount of combined rare earth oxides present in said solution, maintaining the resultant mixture at a temperature ranging from about 90 to 100° C. and on a change in the physical and chemical structure of said calcium sulfate through variance in its degree of hydration, recovering the resultant purified acid solution after separation from the residual calcium sulfate containing adsorbed impurities.

10. A process for removing rare earth compounds from a residual acid solution obtained as a result of the hydrolysis of a titanium salt solution, comprising contacting said solution with an amount of calcium sulfate ranging from about 20 to about 50 times the amount of combined rare earth oxides present in said residual acid solution, during such treatment maintaining the resultant mixture under such acid concentrations and temperature conditions as will induce a change of the physical and chemical characteristics of the calcium sulfate through conversion and transition of said sulfate from one crystal form to another, and thereafter separating and recovering the resultant purified acid solution from the residual calcium sulfate containing adsorbed impurities.

ROY W. SULLIVAN.